United States Patent
Gammack et al.

(10) Patent No.: US 10,006,711 B2
(45) Date of Patent: Jun. 26, 2018

(54) HAND DRYER

(71) Applicant: Dyson Technology Limited, Wiltshire (GB)

(72) Inventors: Peter David Gammack, Swindon (GB); Leigh Michael Ryan, Bristol (GB); Stuart James Steele, Bristol (GB); Stephen Benjamin Courtney, Bath (GB)

(73) Assignee: Dyson Technology Limited, Malmesbury, Wiltshire (GB)

(*) Notice: Subject to any disclaimer, the term of this patent is extended or adjusted under 35 U.S.C. 154(b) by 603 days.

(21) Appl. No.: 14/085,284

(22) Filed: Nov. 20, 2013

(65) Prior Publication Data
US 2014/0137422 A1 May 22, 2014

(30) Foreign Application Priority Data
Nov. 21, 2012 (GB) .................... 1220895.5

(51) Int. Cl.
| | | |
|---|---|---|
| *A45D 20/00* | (2006.01) | |
| *A45D 20/12* | (2006.01) | |
| *F26B 21/00* | (2006.01) | |
| *A47K 10/48* | (2006.01) | |
| *B01D 46/42* | (2006.01) | |

(52) U.S. Cl.
CPC ............ *F26B 21/003* (2013.01); *A47K 10/48* (2013.01); *B01D 46/4236* (2013.01)

(58) Field of Classification Search
CPC .............................. A47K 10/48; F26B 21/003
USPC ........ 34/283, 467, 511, 72, 96, 97; 219/209, 219/222, 227
See application file for complete search history.

(56) References Cited

U.S. PATENT DOCUMENTS

| | | | | |
|---|---|---|---|---|
| 6,035,551 | A * | 3/2000 | Scheufler | ............... B01D 46/00 34/270 |
| 2006/0000110 | A1 | 1/2006 | Aisenberg et al. | |
| 2008/0253754 | A1 * | 10/2008 | Rubin | ............... A45D 20/12 392/381 |
| 2009/0119942 | A1 * | 5/2009 | Aisenberg | ............... A47K 10/48 34/418 |

(Continued)

FOREIGN PATENT DOCUMENTS

| | | |
|---|---|---|
| JP | 7-116076 | 5/1995 |
| JP | 2000-178 | 1/2000 |
| JP | 2010-75602 | 4/2010 |

(Continued)

OTHER PUBLICATIONS

Search Report dated Mar. 14, 2013, directed to GB Application No. 1220895.5; 2 pages.

(Continued)

*Primary Examiner* — John McCormack
(74) *Attorney, Agent, or Firm* — Morrison & Foerster LLP

(57) ABSTRACT

The invention relates to a hand dryer for drying a user's hands by means of an airflow discharged through an air outlet on the hand dryer. The airflow is generated by a motor-driven fan unit. The hand dryer comprises a plurality of air intakes, the air intakes being connected to the fan unit to form a plurality of parallel air-intake paths. Each air intake path is provided with a separate air-filter. The air-filters may be replaceable for individual replacement as required.

9 Claims, 17 Drawing Sheets

(56) References Cited

U.S. PATENT DOCUMENTS

2013/0031799 A1* 2/2013 Gagnon ................ A47K 10/48
34/526

FOREIGN PATENT DOCUMENTS

| WO | WO-2010/088975 | 8/2010 | | |
|---|---|---|---|---|
| WO | WO-2012/139117 | 10/2012 | | |
| WO | WO 2012139117 A1 * | 10/2012 | ............. | A47K 10/48 |

OTHER PUBLICATIONS

International Search Report and Written Opinion dated Apr. 25, 2014, directed to International Application No. PCT/GB2013/052916; 10 pages.

* cited by examiner

HAND DRYER

REFERENCE TO RELATED APPLICATIONS

This application claim the priority of United Kingdom Application No. 1220895.5, filed Nov. 21, 2012, the entire contents of which are incorporated herein by reference.

FIELD OF THE INVENTION

The present invention relates to the field of hand dryers.

BACKGROUND OF THE INVENTION

There are various designs of hand dryer on the market, which are typically installed in public washrooms as an alternative to paper towels.

Hand dryers rely on airflow to dry a user's hands. The airflow is typically discharged through one or more air outlets on the hand dryer and the user holds the hands in close proximity to the air outlet(s) so that the airflow is directed onto the user's hands to provide a drying effect.

The principal drying mechanism may differ between different types of hand dryer. The drying mechanism may be evaporative, in which case the airflow will tend to be heated. Alternatively, the drying mechanism may rely mainly on a momentum-drying effect at the surface of the hands, in which case the airflow will tend to be discharged at high velocity (in excess of 80 m/s, and typically in excess of 140 m/s).

In each case, the airflow is often generated using a motor-driven fan unit which is located inside the hand dryer. Air is drawn into the fan unit through an air intake on the external casing of the hand dryer. The air is often filtered upstream of the fan unit using an air-filter so that the air discharged through the air outlet is filtered air. This makes the hand dryer more hygienic for users.

SUMMARY OF THE INVENTION

According to the present invention there is provided a hand dryer for drying a user's hands by means of an airflow discharged through an air outlet on the hand dryer, the airflow being generated by a motor-driven fan unit, the hand dryer comprising a plurality of air intakes, the air intakes being connected to the fan unit to form a plurality of parallel air-intake paths, each air intake path being provided with a separate air-filter, the filters being arranged around the fan unit.

In accordance with the invention, the hand dryer utilizes a plurality of parallel air intake paths. Each respective air intake path is provided with a separate air-filter. The provision of a plurality of air-filters means that the physical size of the individual filters can be limited—compared to the physical size of a comparable, single filter—allowing them to be packaged in a space-efficient manner inside the hand dryer. This helps reduce the overall size of the hand dryer. This may be particularly beneficial when used to limit the depth of a wall-mounted hand dryer, because certain regulations in the US currently limit the extent to which a wall-mounted hand dryer can project from the wall in certain cases.

The filters may be planar, including curvi-planar or straight ("flat") planarn in the manner of a cassette.

In a particularly space-efficient arrangement, two or more of the filters may be arranged so that their planes face one another. For example, the filters may be arranged facing each other (possibly as a plane-parallel pair) on opposite sides of the fan unit.

The filters are individually replaceable. This has the benefit that some, but not all, of the filters can be replaced as required, reducing wastage.

The filters may be arranged around the fan unit. If the fan unit is cylindrical, then curvi-planar filters may be appropriate, but straight planar filters may nevertheless be preferred for their simple configuration.

The filters may be arranged adjacent the fan unit.

The filters each comprise a filter inlet for the airflow entering the filter, and a filter outlet—connected through the filter to the filter inlet—for the airflow exiting the filter. The filter inlet and filter outlet may be off-set to prevent line-of-sight passing through the inlet and the outlet (assuming the filter itself were absent). This helps prevent noise being transmitted from the fan unit back out through the filters, whilst nevertheless allowing passage of airflow through the filters.

In a particular embodiment, the air intakes are provided on opposite sides of the hand dryer (as viewed front-on), and the respective filters are arranged facing one another on respective sides of the fan unit. Each filter may be provided with an outer filter cover on the outer face of the filter (in-between the filter and the respective air-intake). This filter cover may include one or more apertures defining a filter inlet. Each filter may additionally be provided with an inner filter cover on the inner face of the filter (in-between the filter and the fan unit). The inner filter cover may include one or more apertures defining a filter outlet, connected to the filter inlet through the filter. The apertures are preferably arranged in the respective covers to prevent any line of sight through the filter, so that the airflow path linking the filter inlet to the filter outlet is a convoluted path. Once again, this helps reduce noise transmission externally of the fan unit, back out through the filters and the air intakes.

The hand dryer may be in the form of an air-knife hand dryer in which the air outlet is an air-knife discharge outlet. The air-knife discharge outlet may comprise one or more slit-like discharge apertures. This air-knife discharge outlet is preferably arranged to span a user's hand; for example, the outlet may have a span of 80 mm or more.

The exit speed of the airflow through the air outlet may be in excess of 80 m/s.

BRIEF DESCRIPTION OF THE DRAWINGS

Embodiments of the invention will now be described, by way of example, with reference to the accompany drawings, in which.

DETAILED DESCRIPTION OF THE INVENTION

Hand Dryer

Figure 1:
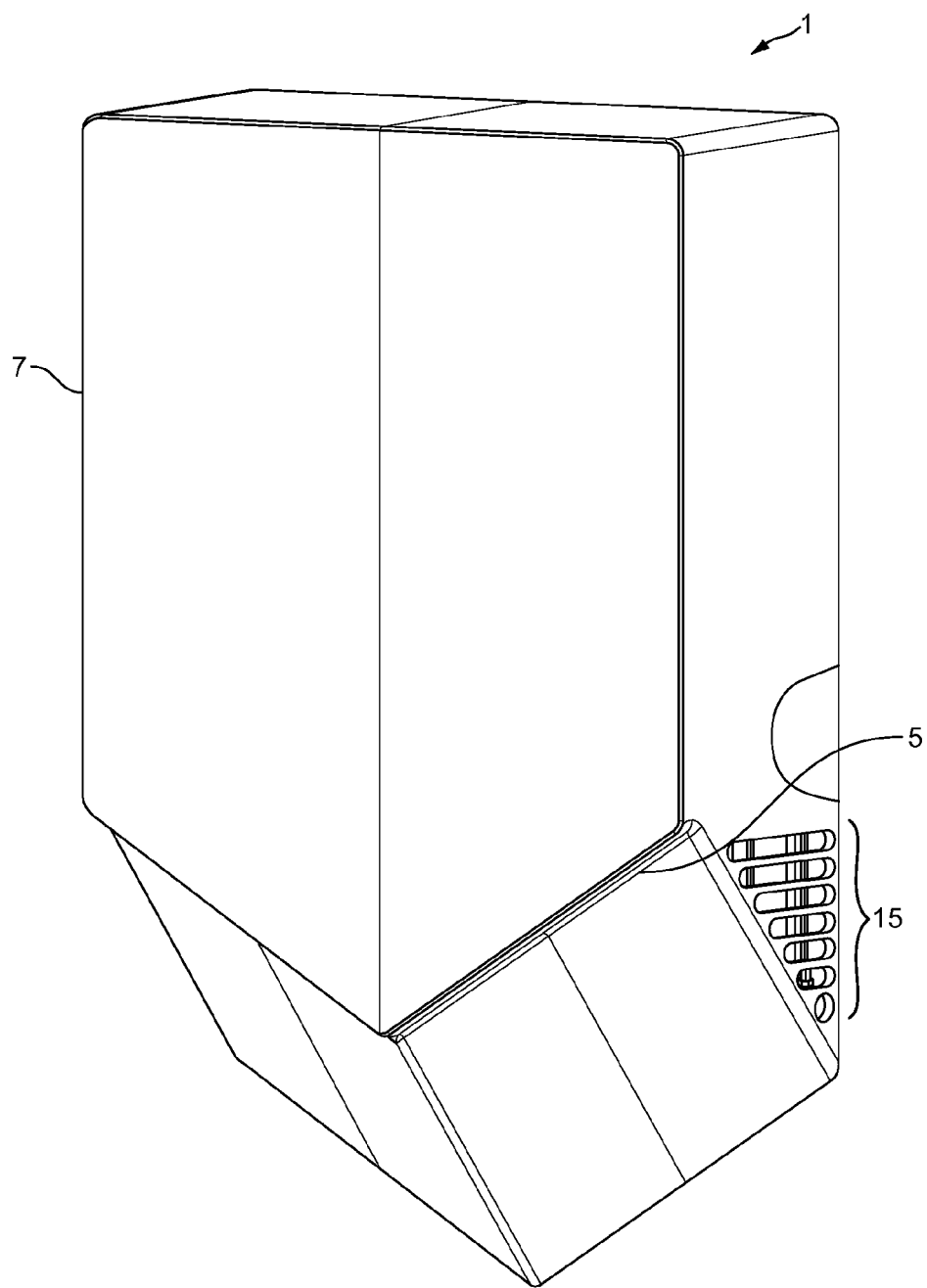
FIG. 1 is a parallel-projected view showing a hand dryer in accordance with the present invention.
Figure 2:
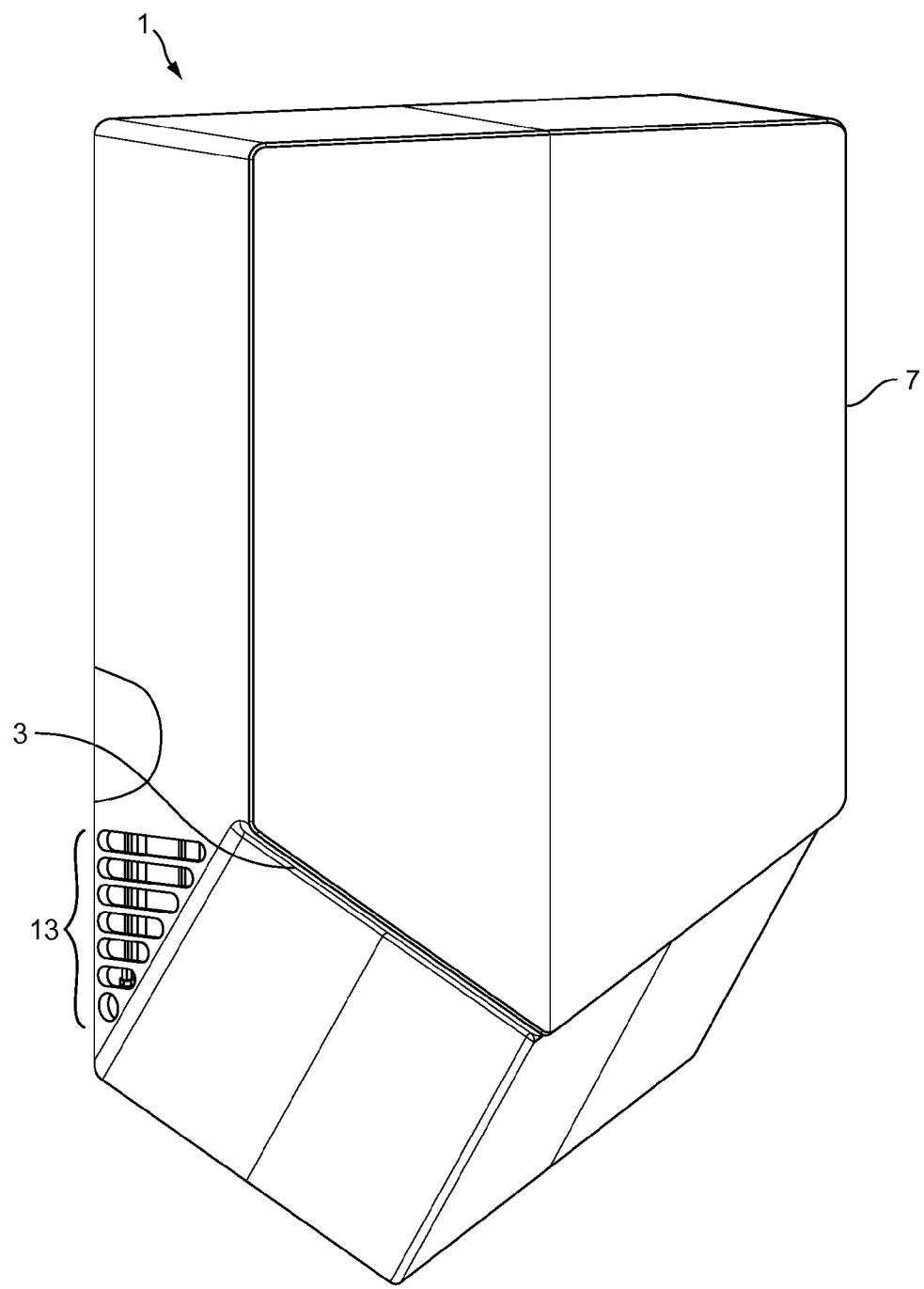
FIG. 2 is a parallel-projected view of the same hand dryer from a reverse angle.
Figure 3:
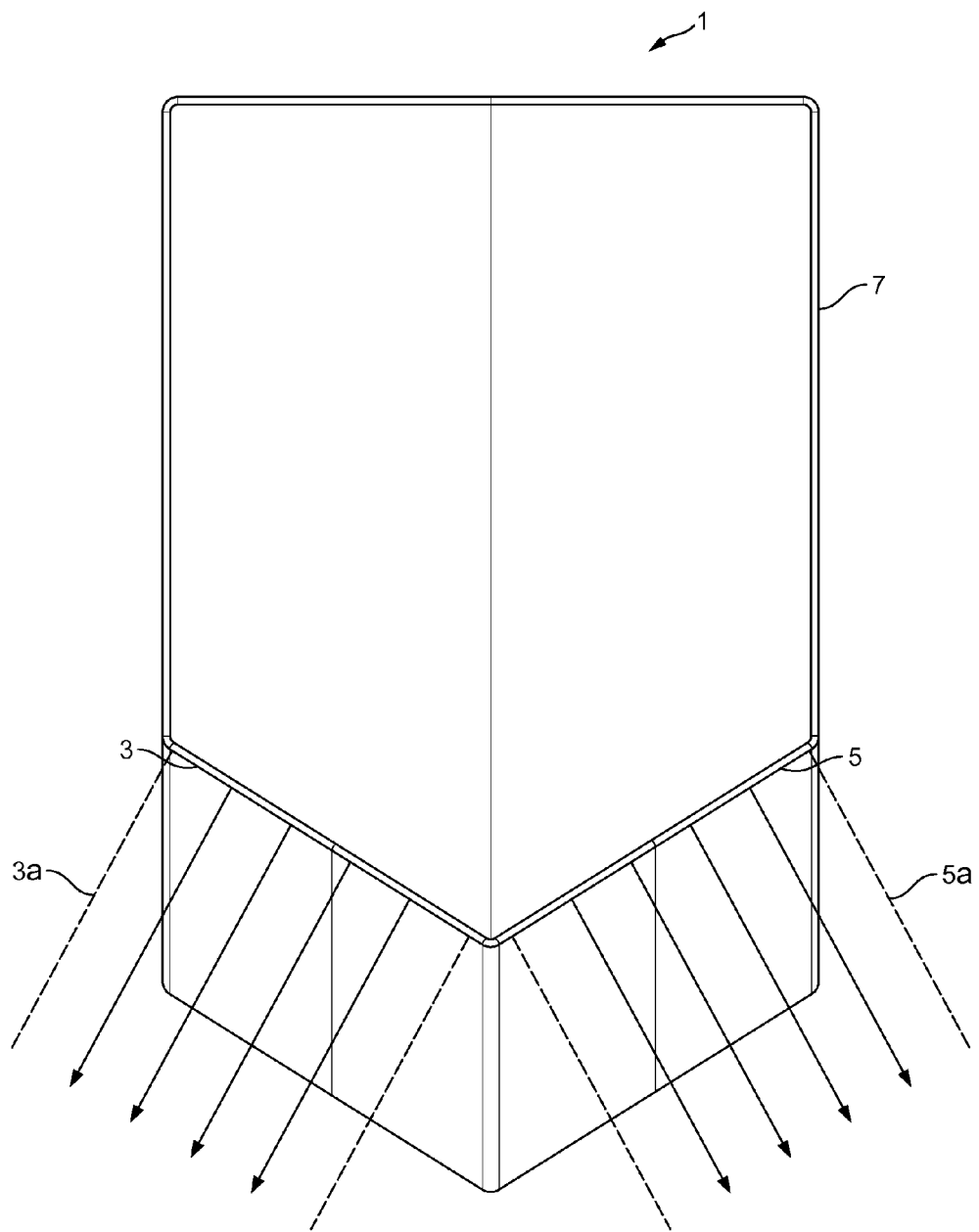
FIG. 3 is a front view of the hand dryer, illustrating discharge of an airflow through an air outlet on the hand dryer in use.

FIGS. 1-3 show a wall-mountable hand dryer 1 in accordance with the invention.

The hand dryer 1 discharges an airflow to dry the user's hands. The airflow is discharged at high speed (>80 m/s) through two air outlets 3, 5 on the hand dryer 1. Each outlet 3, 5 takes the form of an air-knife discharge outlet: in this case a narrow slit—less than 2 mm wide—which is machined directly into the external casing 7 of the hand dryer 1. The airflow is thus discharged as two thin, high velocity sheets of air (FIG. 3) or "air-knives" 3a, 5a.

The mode of operation of the hand dryer 1 is analogous to the established use of air knives in industry to remove debris or liquid from the surface of a product (see e.g. EP2394123A1, which describes removal of debris from a glass sheet using air knives): each air-knife moves across the surface of a respective hand and, as it does so, wipes or scrapes the water from the surface of the hand.

The hands are inserted palm-open underneath the air-knife discharge outlets 3, 5—one hand under each outlet—and then withdrawn slowly to effect the required relative movement between the hands and the air-knives. This process is repeated for both sides of the hands. To make the hand dryer 1 more comfortable to use, the air-knife discharge outlets 3, 5 are arranged in a V-configuration viewed from the front of the dryer 1 (FIG. 3). This helps prevent excessive supination of the forearm in use.

Figure 9:
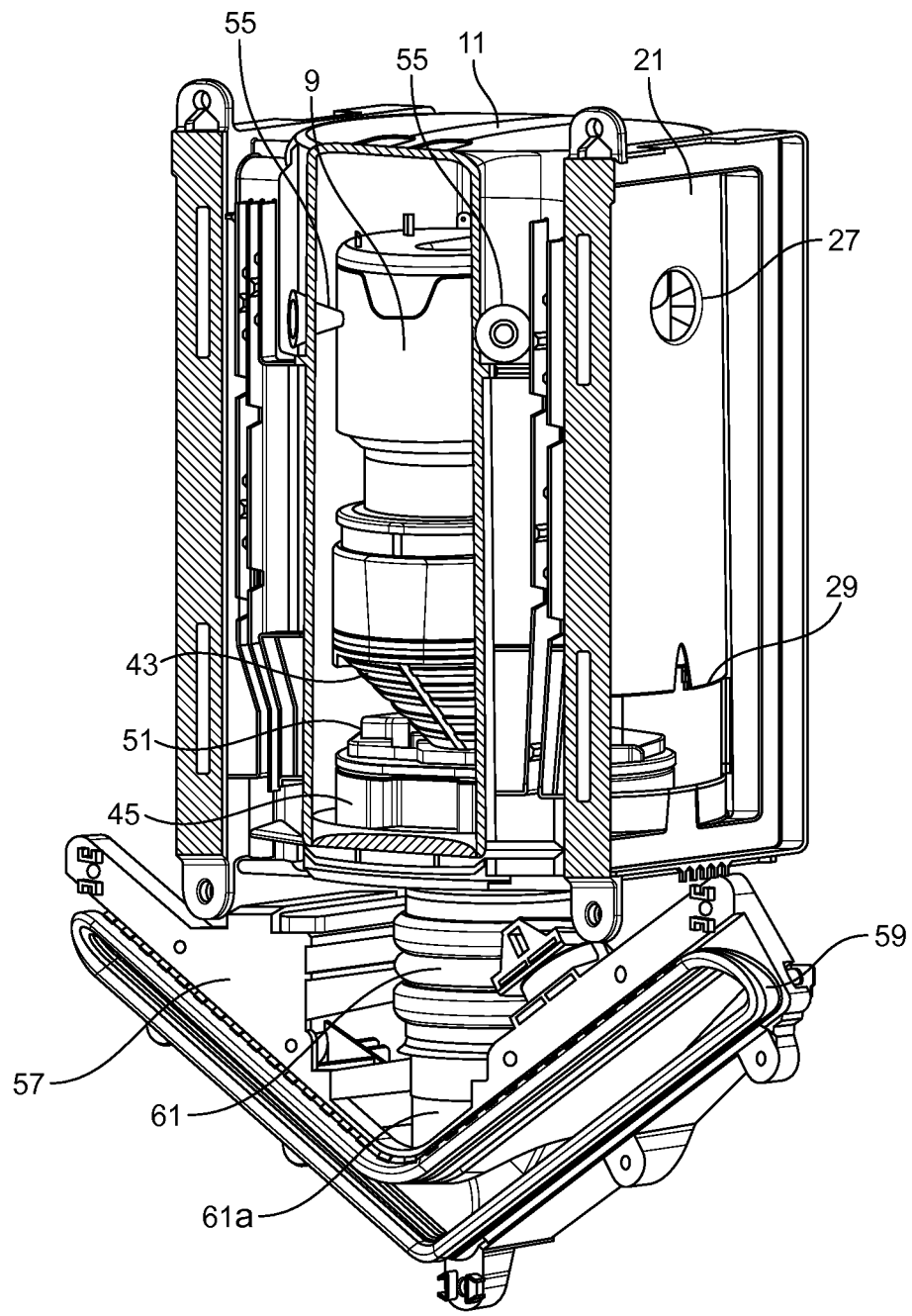
FIG. 9 is a parallel-projected view corresponding to FIG. 8, but partially sectioned to shown a fan unit and an inflatable mount inside a motor bucket.

The airflow is generated by a motor-driven fan unit in the form of a centrifugal blower (or compressor) 9. The centrifugal blower 9 is housed inside a motor bucket 11 inside the external casing 7 of the hand dryer 1. You can see the centrifugal blower 9 and motor bucket 11 in FIG. 9.

Twin Air-filtered Intakes

Figure 4:
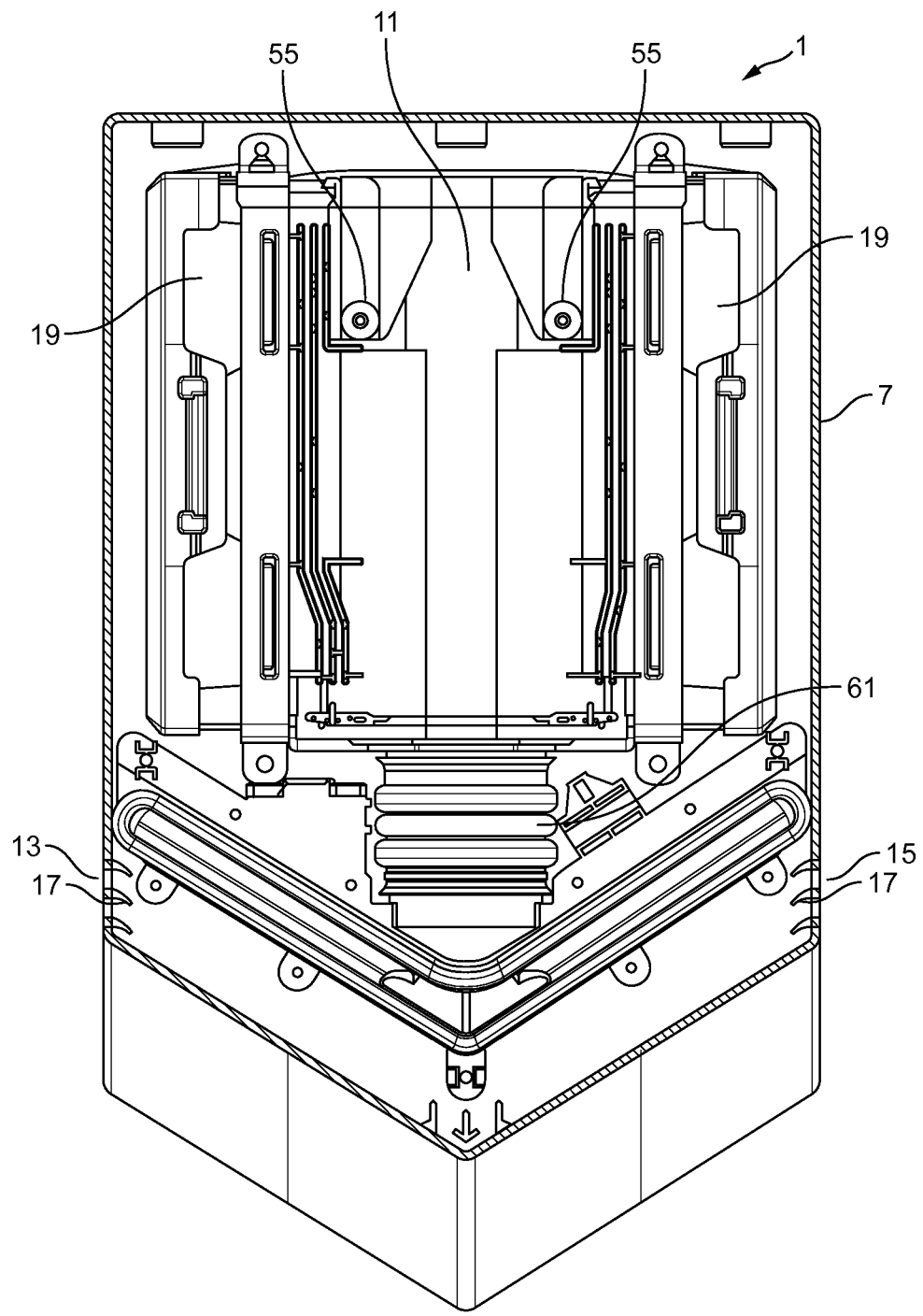
FIG. 4 is a front view of the hand dryer, but with the external casing sectioned to reveal various internal components of the hand dryer.
Figure 5:
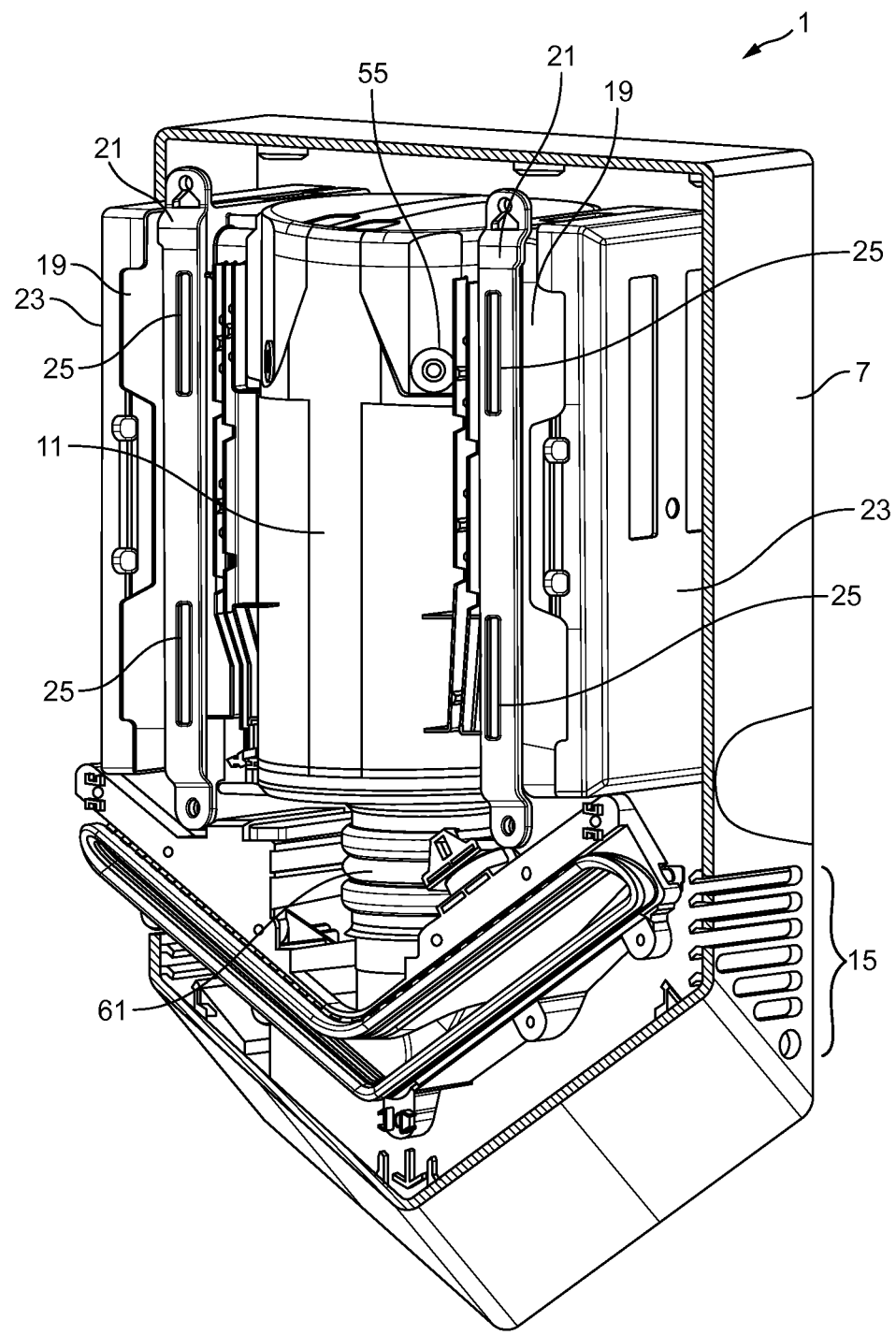
FIG. 5 is a parallel-projected view corresponding to FIG. 4.

The airflow is drawn in by the centrifugal blower 9 through two intakes 13, 15 in the external casing 7 of the hand dryer 1. You can see one of these intakes, 15, in FIG. 1 and the other intake, 13, in FIG. 2. Both of them are visible in FIG. 4, which also shows a series of shroud flaps 17 on the internal side of each intake: intended to help prevent foreign objects being inserted through the intakes 13, 15.

The intakes 13, 15 feed into the motor bucket 11 via two rectangular, planar HEPA filters 19, provided either side of the motor bucket 11. Each filter 19 is sandwiched between a respective inner filter cover 21 and an outer filter cover 23. The filters 19 are thus arranged in plane-parallel configuration either side of the motor bucket 11.

In each case, the inner filter cover 21 is a rectangular cover which forms part of the motor bucket 11. The filter 19 has a rigid frame which clips onto this inner cover (you can see the clips 25 in FIG. 4). Two apertures are provided in the inner filter cover 21: an upper, circular aperture 27 and a lower, generally rectangular aperture 29. These two apertures 27, 29 effectively form a filter outlet through which air exiting the respective filter 19 may pass into the motor bucket 11.

The outer cover 23 is a separate rectangular cover which slips onto the outside of the frame of the respective filter 19. Two parallel rectangular slots 31 are formed in the outer cover 23. These two slots 31 effectively form a filter inlet through which air from the intakes 13, 15 may enter the respective filter 19.

The filter 19 and the outer cover 23 are arranged so that there is a space—or manifold—in between the upstream surface of the filter 19 and the outer cover 23. This helps prevent uneven loading of the filter 19 in use. The inner cover 21 may likewise form a space—or manifold—across the downstream surface of the filter 19.

The filter inlet and filter outlet in each case combine to form an intake path to the blower 9 inside the motor bucket 11. Thus, there are two parallel intake paths: one through each of the two air-filters 19.

In each case the filter inlet is offset from the filter outlet so that there is no line of sight through the filter outlet and the respective filter inlet: the lower rectangular aperture 29 in the inner cover 21 is positioned somewhat below the vertical slots 31 forming the respective filter inlet whereas the upper, circular aperture 27 is positioned in-between the vertical slots 31 forming the respective filter inlet. In effect, each air intake path to the blower 9 follows a convoluted path through the respective filter 19.

The filters 19 are individually replaceable: each one can be removed simply by unclipping it from the inner cover 21 and once removed, a new filter can then be clipped onto the inner cover 21 in its place (the outer cover 23 can also be unclipped and re-used, or else may be disposable).

Soft-mounting Arrangement for Fan Unit

Figure 13:
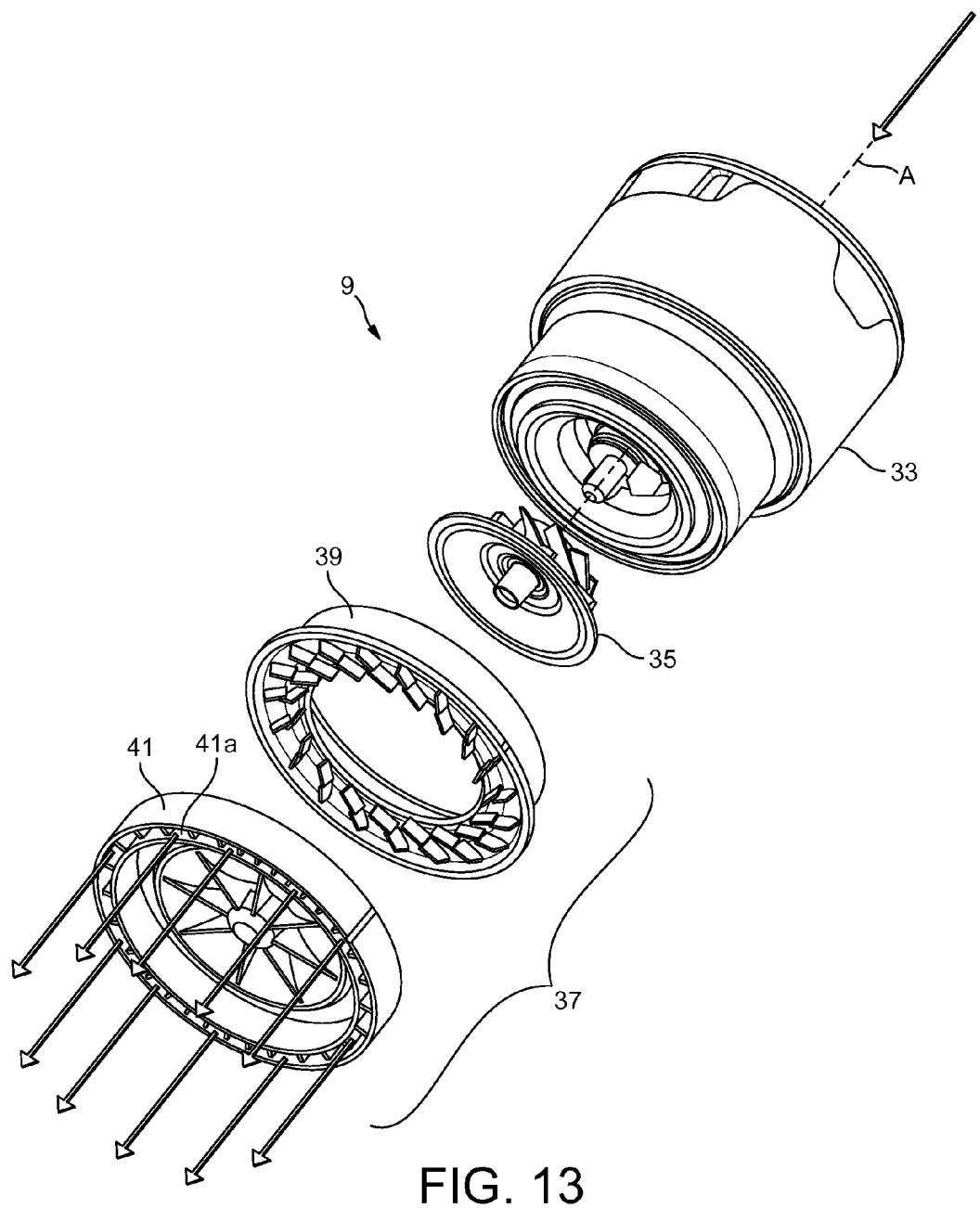
FIG. 13 is an exploded view of the fan unit, showing an impeller arranged along a fan axis and a diffuser defining an annular fan outlet.

An exploded view of the centrifugal blower 9 is shown in FIG. 13. It comprises a drive unit 33 incorporating an electric motor (not shown), a centrifugal fan impeller 35 which connects to the output shaft of the motor, and a diffuser 37. The diffuser comprises a diffuser ring 39, incorporating a number of swirl vanes for static pressure recovery, and a diffuser cap 41 which fits onto the diffuser ring 39 and which channels airflow from the impeller 35 out through an annular fan outlet 41a, as indicated by the arrows (in use, there will be a certain degree of residual swirl to the airflow as it leaves the fan outlet 41a—not illustrated in FIG. 13).

The centrifugal blower 9 is soft-mounted vertically inside the motor bucket 11, with the fan outlet 41a facing downwards and the rotation axis A of the impeller 35 extending vertical.

The soft-mounting arrangement for the centrifugal blower 9 comprises an upper soft-mounting assembly and a lower soft-mounting assembly.

The lower soft-mounting assembly takes the form of an elastomeric duct 43 which extends end-to-end underneath the centrifugal blower 9. The duct 43 is funnel-shaped, having a relatively large cross-section at the top (adjacent the fan outlet 41a), but tapering to a relatively small cross-section at the bottom.

The upper end of the duct 43 fits around the diffuser 37 like a sleeve and is clamped in position using a cable-tie (not shown).

Figure 6:
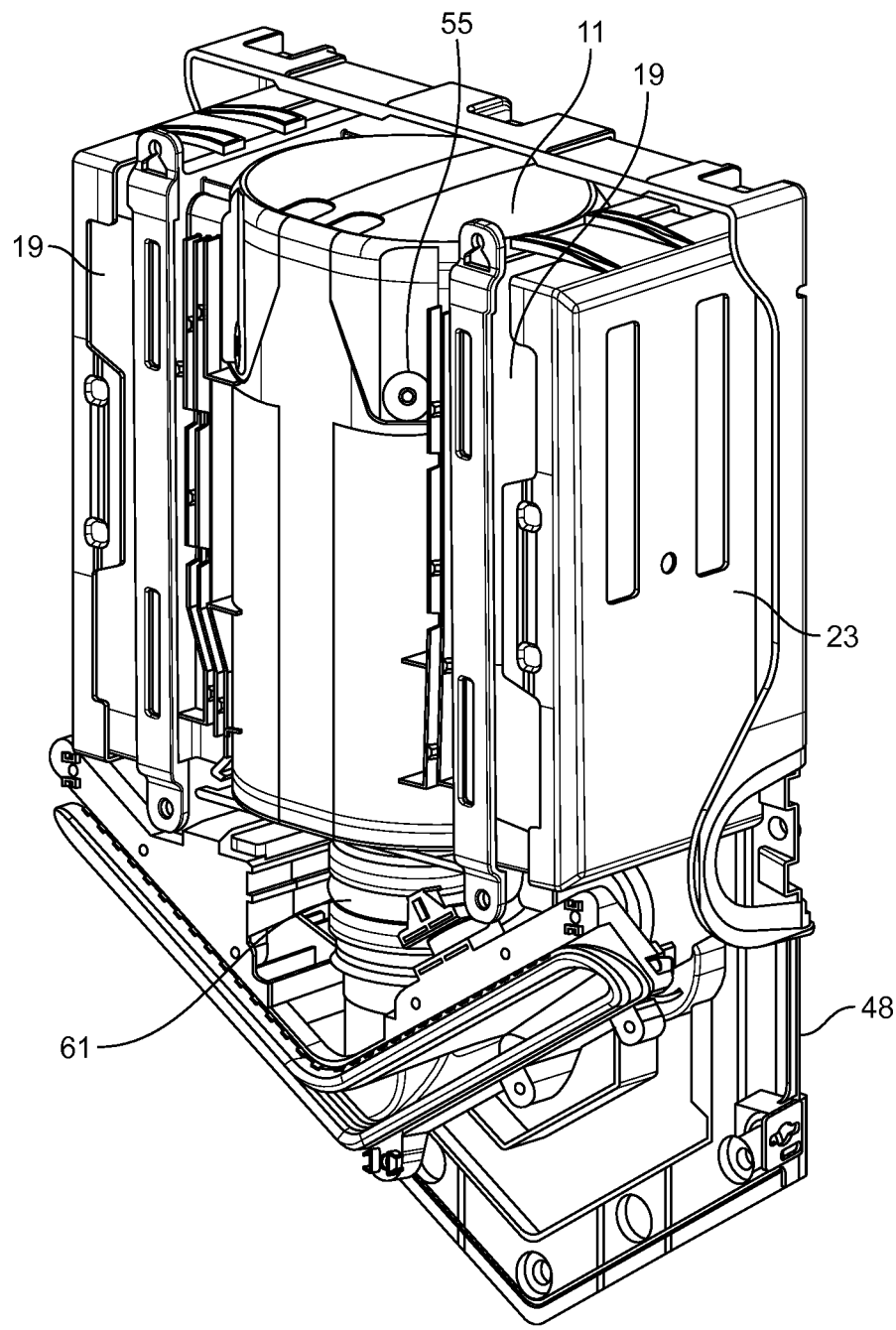
FIG. 6 is a parallel-projected view of the hand dryer with the fascia removed, illustrating mounting of various internal components on a back-plate of the hand dryer.
Figure 7:
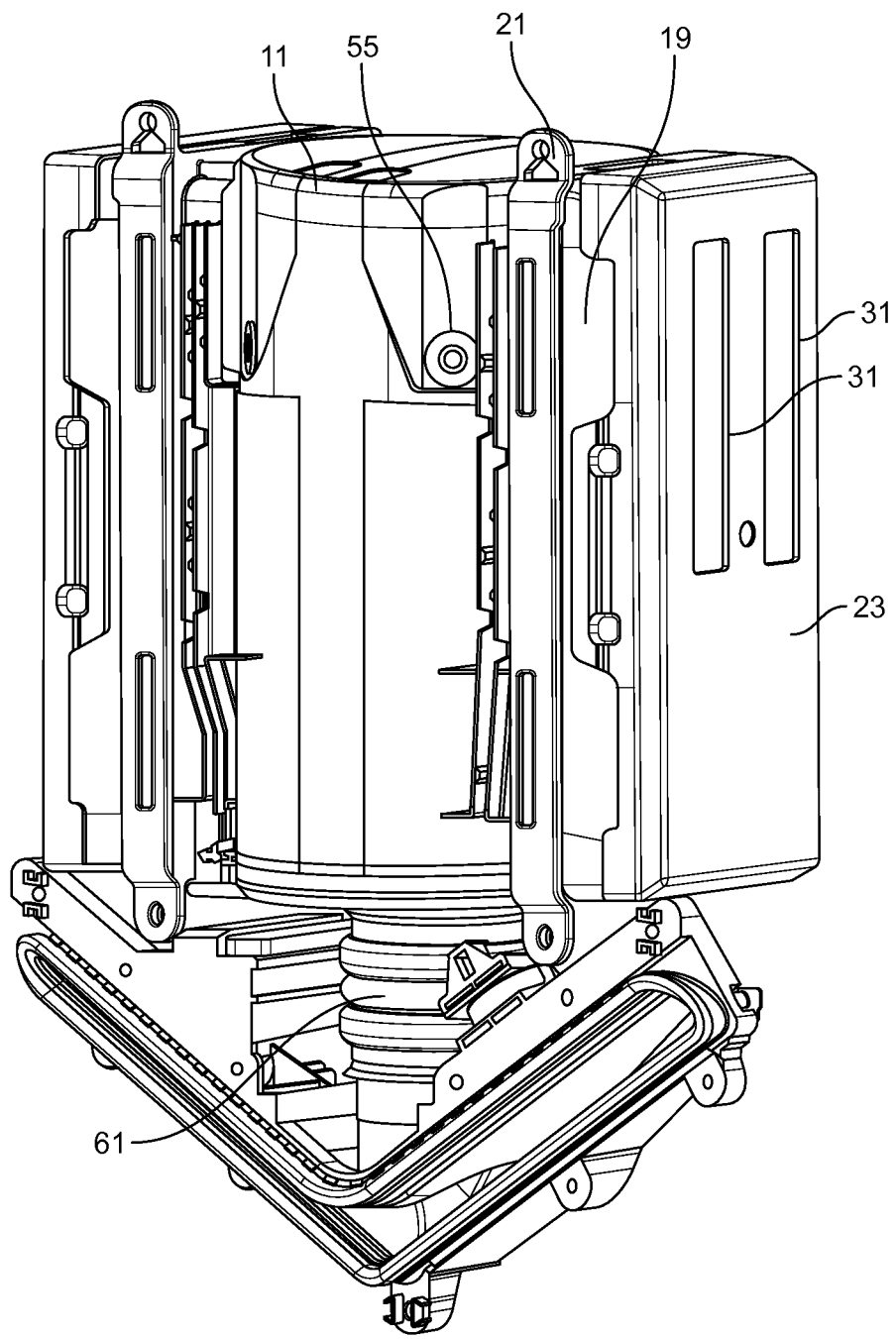
FIG. 7 is a parallel-projected view showing various internal components of the hand dryer—notably an air-filter in the primary airflow path.
Figure 8:
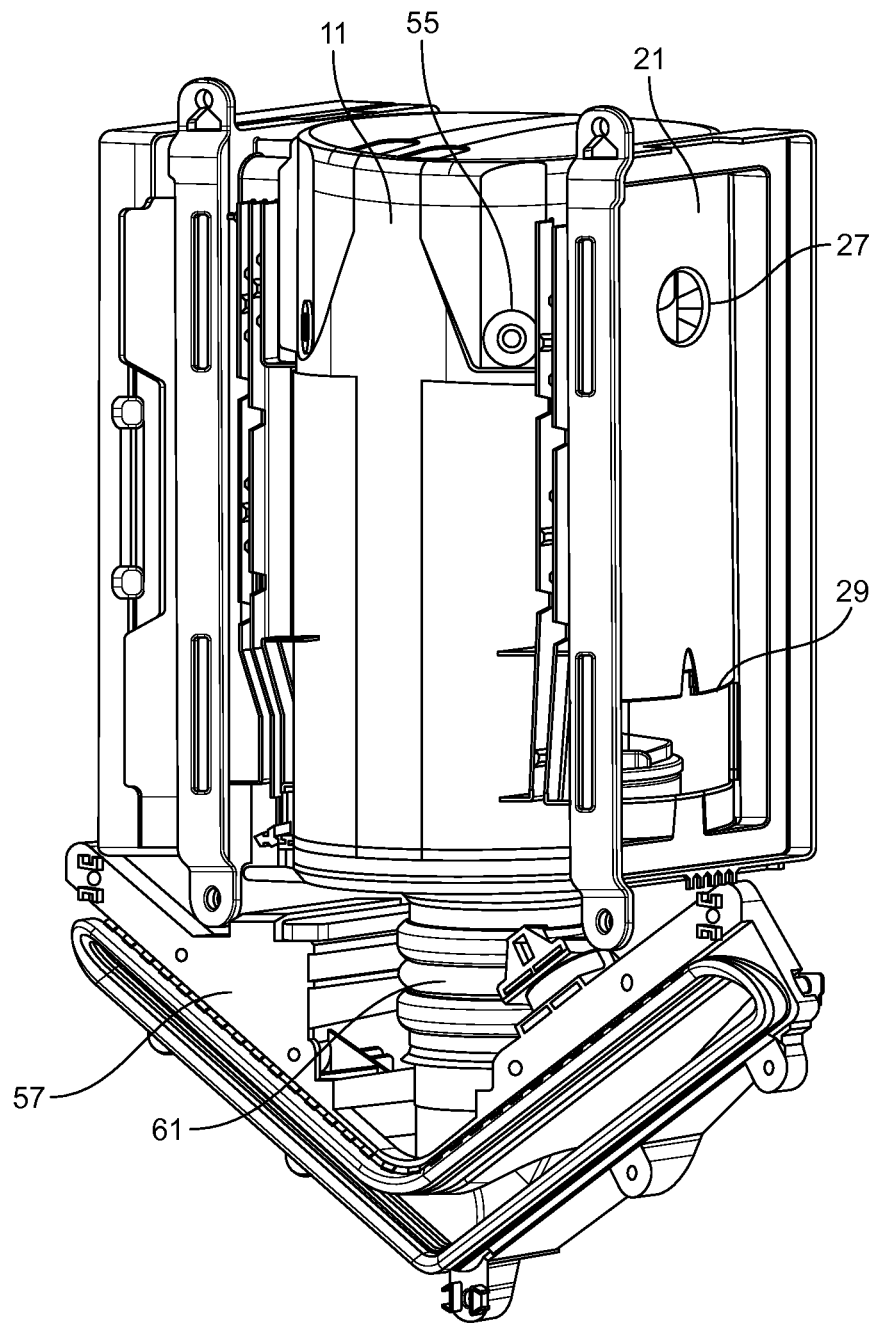
FIG. 8 is a view corresponding to FIG. 7, but with the filter removed.

The lower end of the inflatable duct 43 is secured to a base plate 45, which is hard-mounted to the main back-plate 48 of the dryer (FIG. 6) to provide load-bearing support.

Figure 11:
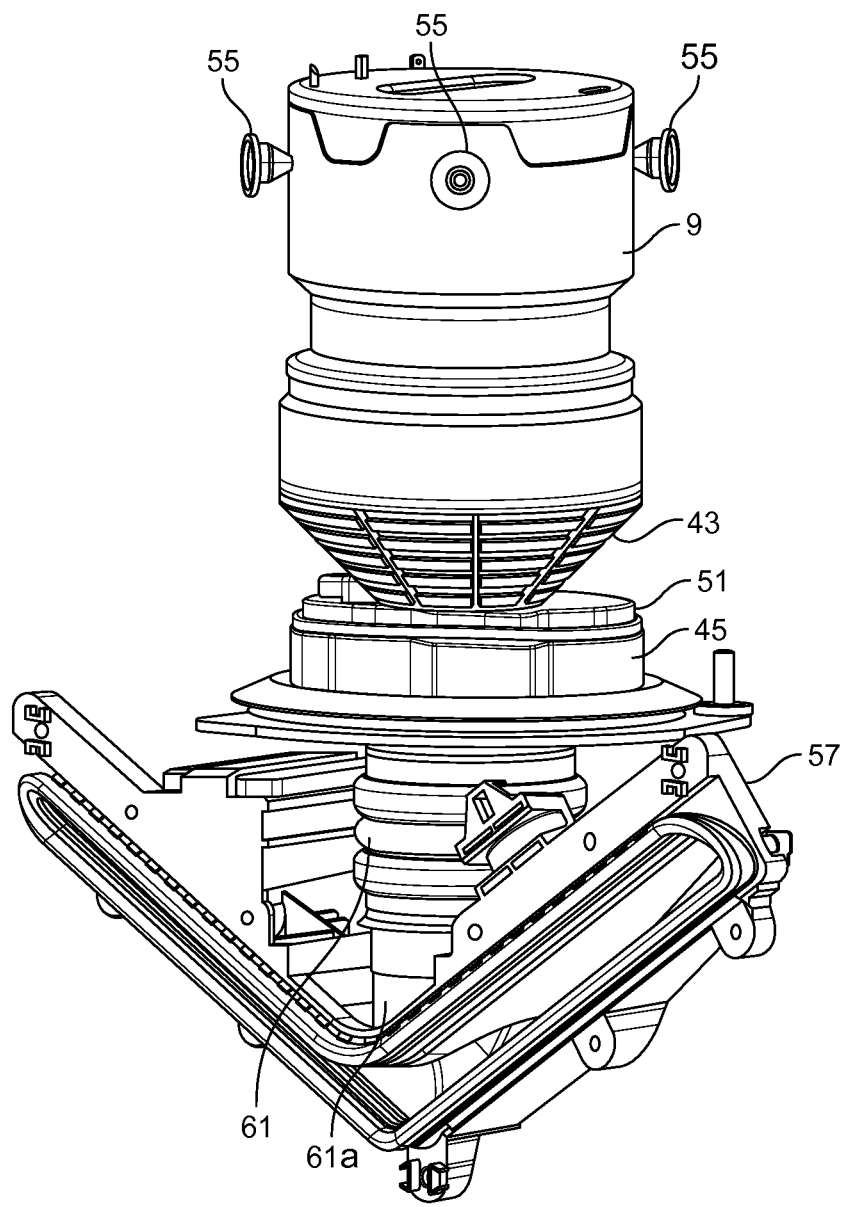
FIG. 11 is a parallel-projected view corresponding to FIG. 9, but with the motor bucket removed entirely to illustrate a plurality of point mounts for the fan unit.
Figure 12:
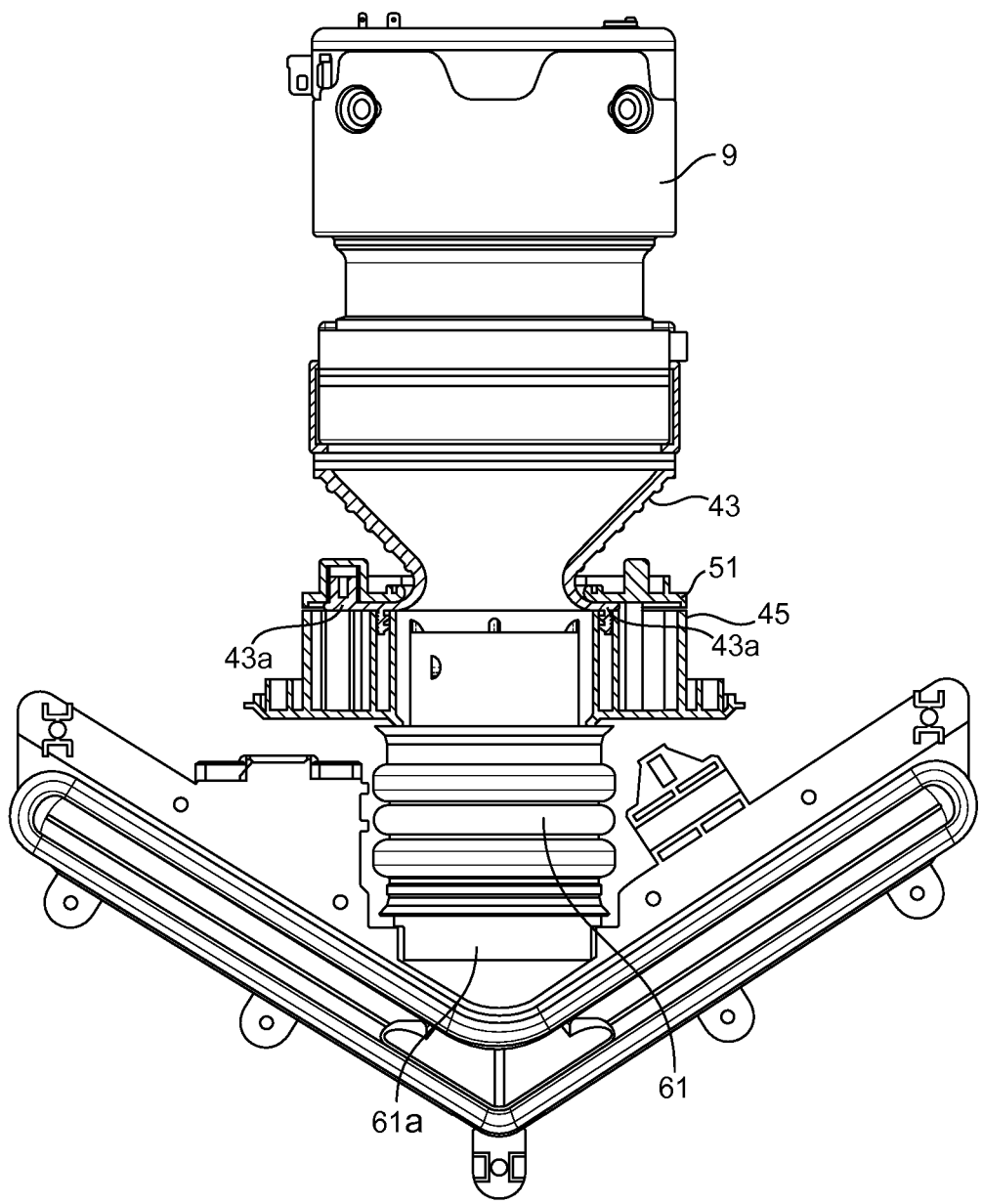
FIG. 12 is a partial-sectional view of certain internal components of the hand dryer, notably the fan unit and a section through the inflatable mount.
Figure 14:
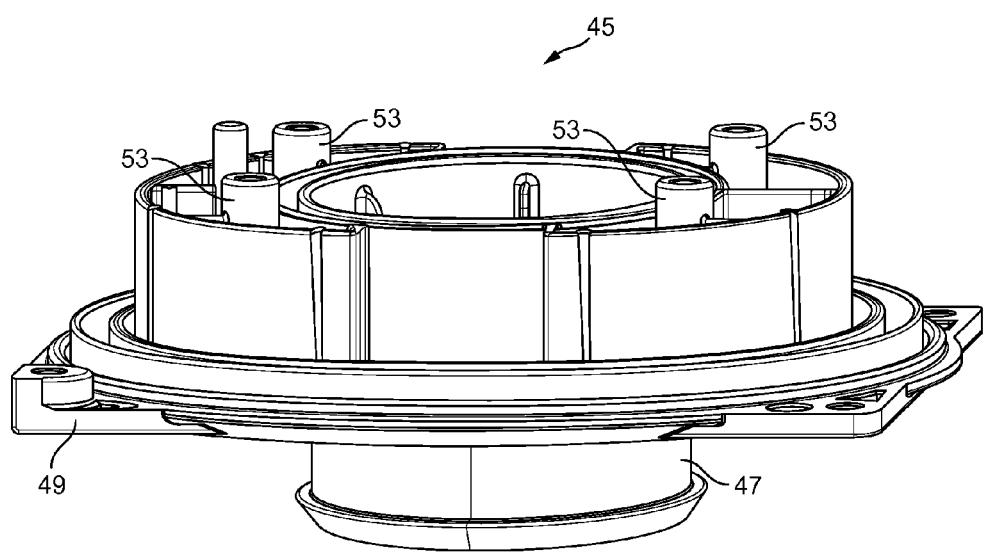
FIG. 14 is a parallel-projected view of a component inside the hand dryer, used to mount the fan unit.

You can see the base plate in FIG. 14. It comprises a central connecting duct 47 surrounded by a mounting platform 49. The lower end of the inflatable duct 43 is seated around the entrance to the connecting duct 47, and secured to the mounting platform 49 by means of a clamping ring 51 (FIG. 11). This clamping ring 51 is screwed down onto the mounting platform 49 (you can see the screw bosses 53 in FIG. 14) and clamps against a flange 43a forming part of the lower end of the inflatable duct, which then also acts s a compression seal between the clamping ring 51 and the mounting platform 49.

The upper soft-mounting assembly comprises four "point mounts", taking the form of elastomeric conical supporting members 55.

Each one of the supporting members 55 is mounted, at its base, to the motor bucket 11 and is arranged to extend radially inwardly—relative to the rotation axis A of the impeller—so that the conical vertex of the supporting member 55 makes contact with the external casing of the centrifugal blower 9. The upper soft-mounting assembly thus makes four "point-contacts" with the external casing of the centrifugal blower 9, one for each of the four supporting members 55.

A V-shaped manifold 57 is provided to distribute the airflow to the two air-knife discharge outlets 3, 5. The manifold 57 is screwed onto the internal face of the casing 7, over the top of the air-knife discharge outlets 3, 5. A resilient gasket 59 is used to form a compression seal between the manifold 57 and the casing of the hand dryer.

The manifold 57 is connected to the lower end of the connecting duct 47 on the base plate 45 via a flexible hose 61, which is intended to take up assembly tolerances between the base plate 45 and the manifold 57. One end of the flexible 61 hose push-fits onto the lower end of the connecting duct 47 and the other end of the hose 61 similarly push-fits onto an inlet duct 61a forming part of the manifold 57. Cable ties (not shown) may be used at each end of the flexible duct 61 to hold the flexible duct 61 in place.

The combined area of the air-knife discharge outlets 3, 5 is relatively small compared to the area of the fan outlet 41a. Consequently, the air-knife discharge outlets 3, 5 constitute a significant flow restriction in the primary airflow path downstream of the fan outlet 41a. What happens therefore is that, on start-up of the centrifugal blower 9 there is a significant increase in static pressure downstream of the blower 9. This has the effect of pressurizing the inflatable duct 43, which consequently acts as a pneumatic supporting column for the centrifugal blower 9, helping to limit displacement of the blower 9 and to dampen motor vibrations caused by rotor imbalance etc.

Because the primary airflow is used to pressurize the inflatable duct 43 on start-up of the blower 9, the arrangement is relatively simple: no bleed paths, valves or separate pneumatic circuit is required.

For a given blower specification, the rate of pressurization of the inflatable duct 43 will depend on the effective volume between the fan outlet 41a and the air outlets 3, 5 (the 'working volume'), and also the combined area of the air outlets 13, 15 (the 'discharge area'). Consequently, pressurization of the inflatable mount 43 will generally be more rapid in an air-knife dryer, which will generally have a relatively small discharge area. Here, inflation of the mount may be very rapid for a given working volume—providing a very quick initial damping response.

In use, the supporting members 55 provide effective lateral support for the centrifugal blower 9 (support against axial displacement of the blower 9 is provided almost entirely by the inflatable mount 43). At the same time, the supporting members 55 reduce external vibration transmission by significantly limiting the contact area between the drive unit 33 and the motor bucket 11.

In combination, the supporting members 55 and the inflatable mount 43 together form an effective soft-mounting arrangement for the blower 9 which reduces noise transmission to external parts of the hand dryer 1.

Inflatable Mount

Figure 10:
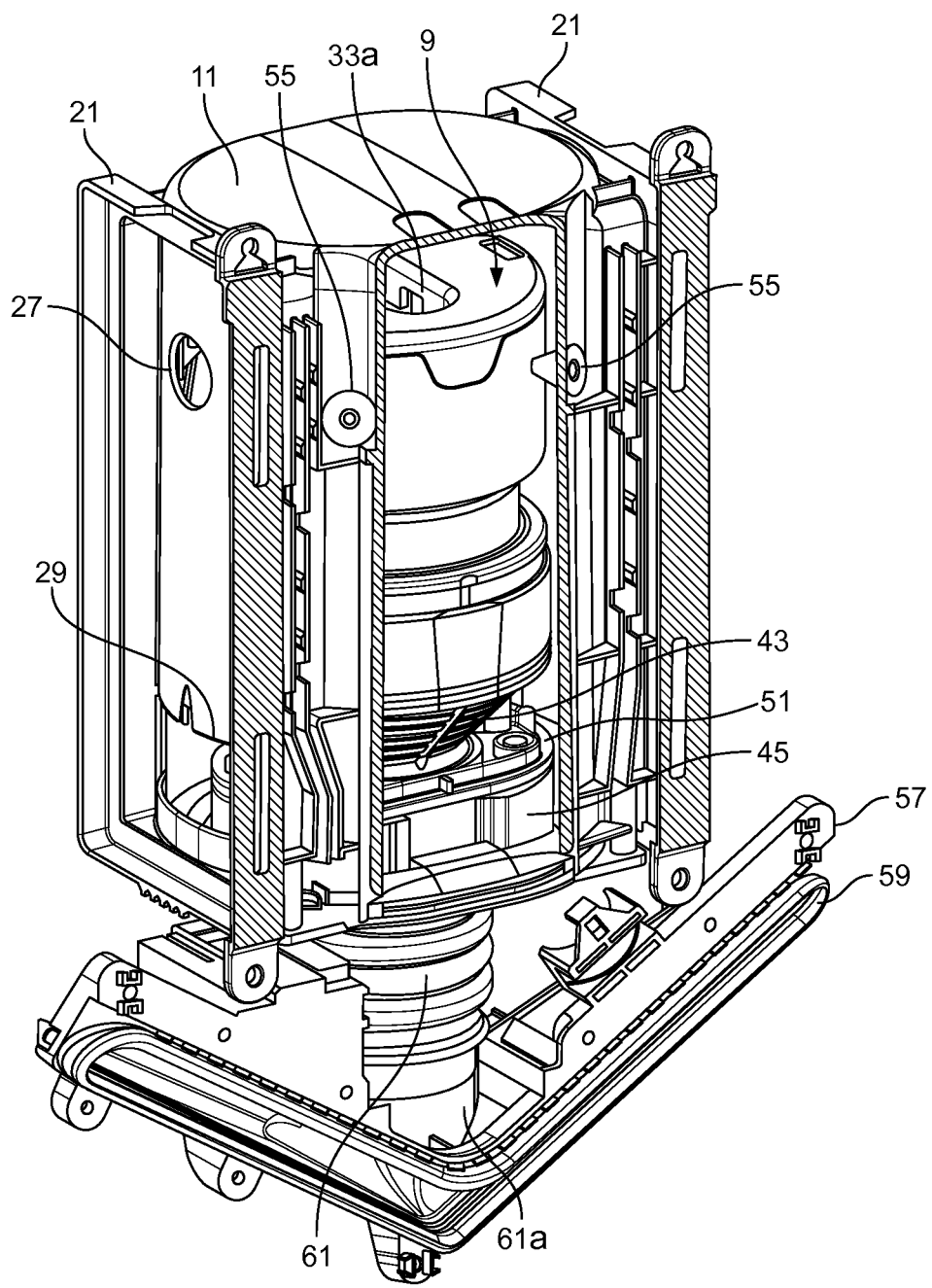
FIG. 10 is a parallel-projected view corresponding to FIG. 9, but from the reverse angle.
Figure 15A:
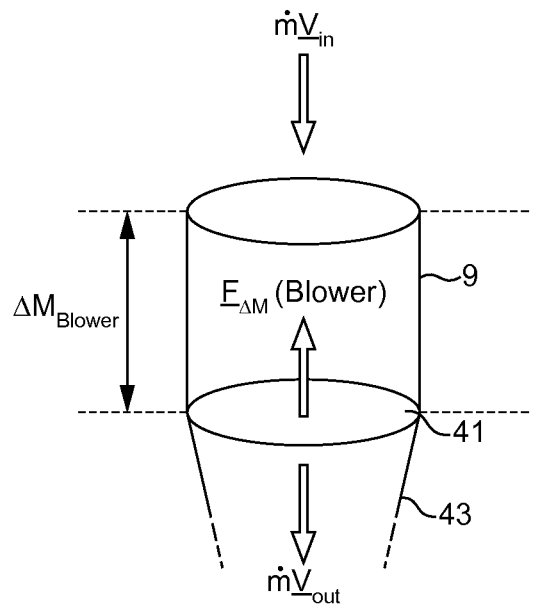
FIG. 15a is a schematic illustration of the jet thrust exerted directly on the fan unit.
Figure 15B:
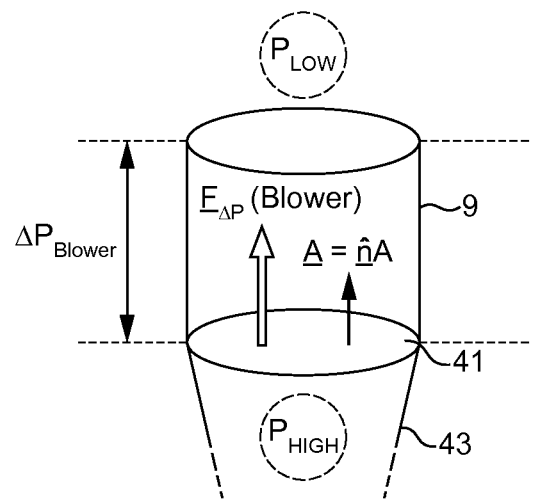
FIG. 15b is a schematic illustration of the net pressure force exerted directly on the fan unit.

In use there will be a momentum differential $\Delta M_{Blower}$ across the blower 9, between the blower inlet 33a on the drive unit 33 (FIG. 10) and the fan outlet 41a. This is illustrated schematically in FIG. 15a. In addition to this momentum differential $\Delta M_{Blower}$, there will be a significant static pressure differential $\Delta P_{Blower}$ between the intake and the fan outlet, following pressurization of the working volume downstream of the fan outlet. This is illustrated schematically in FIG. 15b.

The momentum differential $\Delta M_{Blower}$ gives rise to a 'jet thrust' $\underline{F}_{\Delta P}$(Blower) which tends to force the blower 9 vertically upwards.

The pressure-differential $\Delta P_{Blower}$ acts on the vector area $\underline{A}$ of the diffuser cap 41—effectively corresponding to the vector area of the inflatable duct 43, adjacent the fan outlet 41a—and consequently exerts a net upward pressure force $\underline{F}_{\Delta P}$(Blower)=$\Delta P_{Blower}\underline{A}$ on the blower 9. This pressure force also tends to force the blower 9 vertically upwards.

Both the jet thrust $\underline{F}_{\Delta M}$ (Blower) and the pressure force $\underline{F}_{\Delta P}$(Blower) exerted on the blower 9 are resisted by the pressurized inflatable duct 43, which secures the blower 9 to the base plate 45. In turn, this places stress on the clamping ring 51 which secures the inflatable duct 43 on the base plate 45.

There will also be a momentum differential $\Delta M_{Duct}$ and pressure differential $\Delta P_{Duct}$ between the blower intake and the lower end of the inflatable duct 43. This is illustrated in FIGS. 16a and 16b.

In this case the momentum differential $\Delta M_{Duct}$ and pressure differential $\Delta P_{Duct}$ exert a force directly on the inflatable duct 43, rather than directly on the blower 9.

Figure 16A:
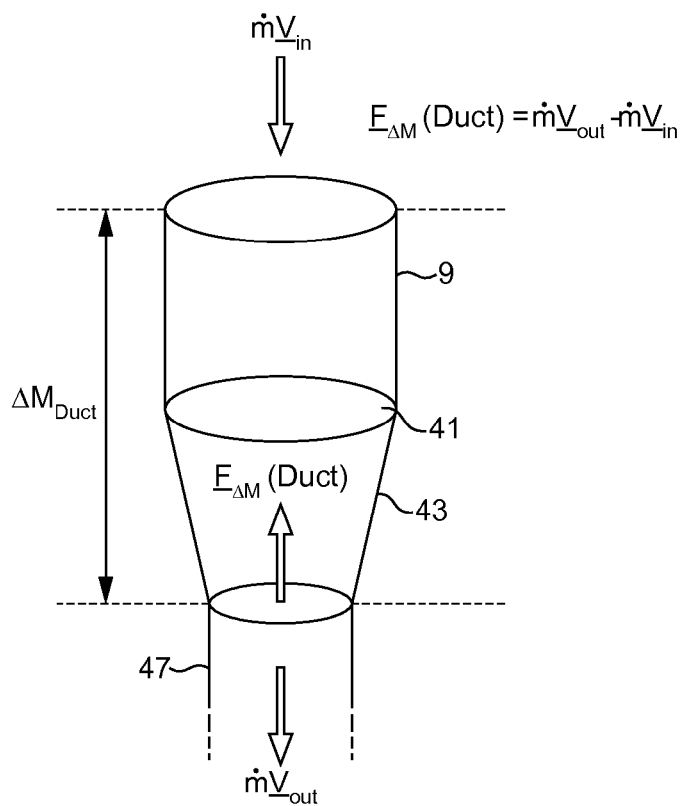
FIG. 16a is schematic illustration of the jet thrust exerted directly on the inflatable mount supporting the fan unit.

Referring to FIG. 16a, the momentum differential $\Delta M_{Duct}$ gives rise to a jet thrust $\underline{F}_{\Delta M}$ Duct), which tends to push the inflatable duct 43 upwards against the clamping ring 51.

Figure 16B:
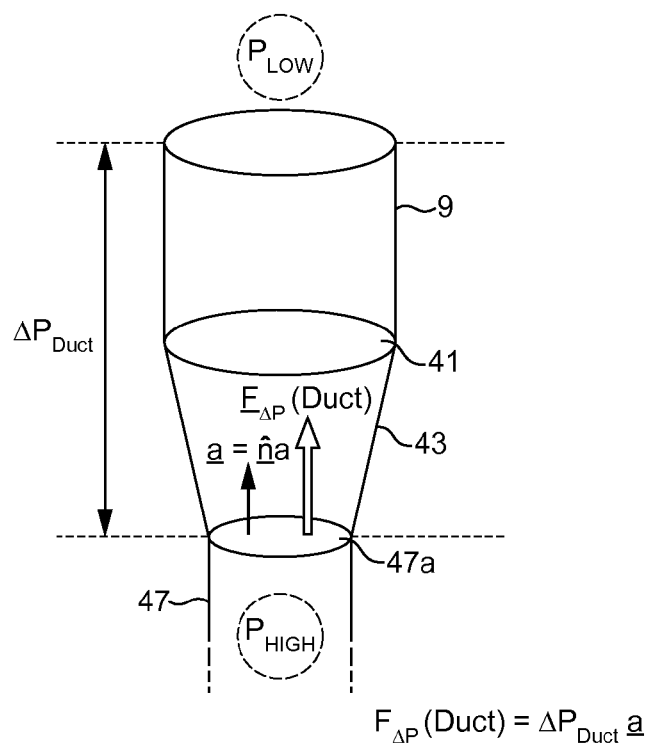
FIG. 16b is a schematic illustration of the net pressure force exerted directly on the inflatable mount.

Referring to FIG. 16b, the pressure differential $\Delta P_{Duct}$ acts on the vector area $\underline{a}$ of the connecting duct 47, and consequently exerts a net upward pressure force $\underline{F}_{AP}(\text{Duct})=\Delta Pa$ on the inflatable duct 43. This again tends to push the inflatable duct 43 upwards against the clamping ring 51, placing an additional stress on the clamping ring 51.

If the connecting duct 47 had the vector area $\underline{A}$—corresponding to the vector area of the diffuser cap 41—the pressure force $\underline{F}_{AP}(\text{Duct})$ exerted directly on the inflatable duct 43 would be of substantially the same magnitude as the pressure force $\underline{F}_{AP}(\text{Blower})$ exerted on the blower 9, and the resultant stress on the clamping ring 51 may be significant. To address this problem, the diameter of the connecting duct 47 is instead set so that the magnitude of the vector area a of the connecting duct 47 is less than the magnitude of the vector area $\underline{A}$ of the diffuser cap 41. The connecting duct 47 thus effectively defines a fixed orifice 47a having a reduced area relative to the area of the diffuser cap 41 (essentially, a deliberate restriction to the airflow). This has the benefit of reducing the magnitude of the pressure force $\underline{F}_{AP}(\text{Duct})$ exerted directly on the inflatable duct 43, relative to the pressure force $\underline{F}_{AP}(\text{Blower})$ exerted directly on the blower 9. This reduction is achieved independently of the diffuser area A, which can consequently be optimized as part of the blower specification.

The jet thrust $\underline{F}_{AM}$ (Duct) will also tend to force the inflatable mount 43 upwards.

Figure 17:
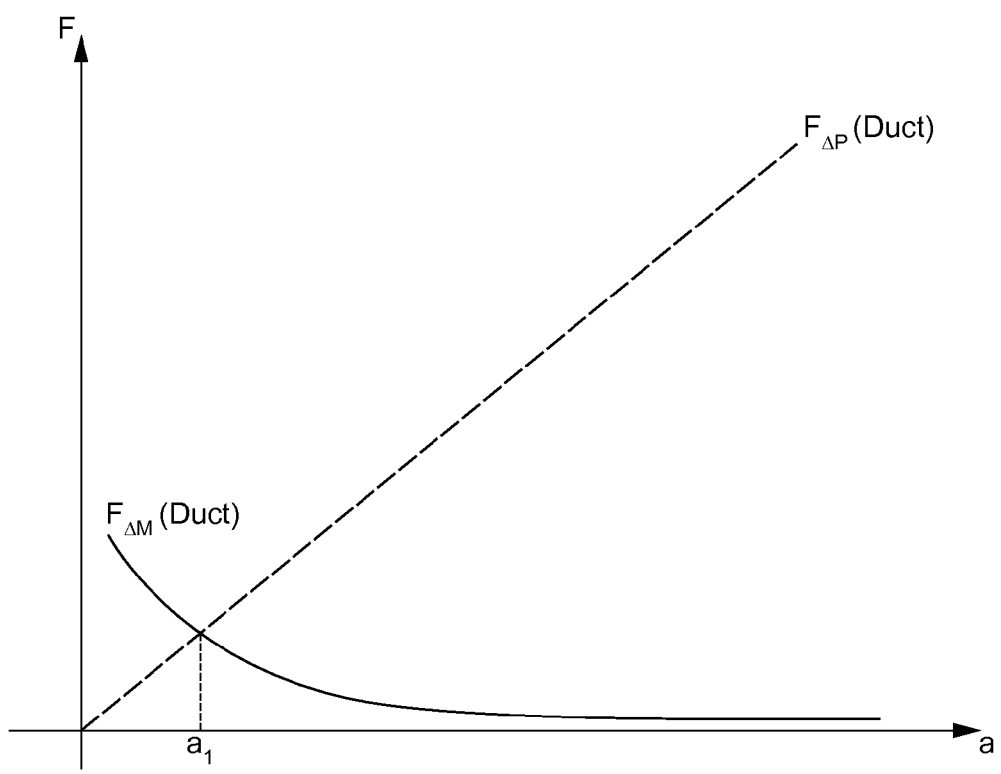
FIG. 17 is a graphical illustration of the pressure force $F_{AA}p$(Duct) and jet thrust $F_{AM}$(Duct) as a function of the orifice area a in FIG. 16b.

However, the magnitude of the jet thrust $\underline{F}_{AM}(\text{Duct})$ is generally relatively small and remains fairly constant for a wide range of orifice areas. Consequently, a reduction in the pressure force $\underline{F}_{AP}(\text{Duct})$ exerted on the inflatable mount 43 can generally be obtained without any corresponding increase in the jet thrust $\underline{F}_{AM}$ (Duct) exerted on the inflatable mount 43. You can see this in FIG. 17, which shows $\underline{F}_{AP}(\text{Duct})$ and $\underline{F}_{AM}$ (Duct) as a function of the orifice area a.

At very small orifice areas (a<$a_1$), the jet thrust $\underline{F}_{AM}$ (Duct) may become significant. If the sole intention is to reduce stress on the clamping ring 51, care must be taken not to offset any reduction in the pressure force $\underline{F}_{AP}(\text{Duct})$ by an increase in the corresponding jet thrust $\underline{F}_{AM}$ (Duct). Nevertheless, a reduction in the pressure force $\underline{F}_{AP}(\text{Duct})$ per se can still advantageously be obtained, even at these small orifice areas.

The invention claimed is:

1. A hand dryer for drying a user's hands by an airflow discharged through an air outlet on the hand dryer, the airflow being generated by a motor-driven fan unit, the hand dryer comprising:
a plurality of air intakes, the air intakes being connected to the fan unit to form a plurality of parallel air-intake paths, each air intake path being provided with a separate air-filter;
an outer filter cover associated with each filter comprising a plurality of slots forming a filter inlet for the respective filter, the outer filter cover positioned in-between the respective filter and the respective air intake; and
an inner filter cover associated with each filter comprising a plurality of apertures forming a filter outlet for the respective filter, the inner filter cover positioned in-between the respective filter and the fan unit, the filter inlet and filter outlet being off-set to prevent line-of-sight through the filter inlet and the filter outlet.

2. A hand dryer for drying a user's hands by an airflow discharged through an air outlet on the hand dryer, the airflow being generated by a motor-driven fan unit, the hand dryer comprising a plurality of air intakes, the air intakes being connected to the fan unit to form a plurality of parallel air-intake paths, each air intake path being provided with a separate air-filter, the hand dryer further comprising an air intake on one side of the hand dryer (when the hand dryer is viewed front-on) and an air intake on the opposite side of the hand dryer, the respective air-filters being arranged on respective sides of the fan unit, an outer filter cover associated with each filter comprising a plurality of slots forming a filter inlet for the respective filter, the outer filter cover positioned in-between the respective filter and the respective air intake, an inner filter cover associated with each filter comprising a plurality of apertures forming a filter outlet for the respective filter, the inner filter cover positioned in-between the respective filter and the fan unit, the respective filter inlets and filter outlets being off-set to prevent line-of-sight through the respective filter inlet and filter outlet.

3. The hand dryer of claim 2, wherein the filters are planar and are arranged with their planes facing one another.

4. A hand dryer for drying a user's hands by an airflow discharged through an air outlet on the hand dryer, the airflow being generated by a motor-driven fan unit wherein a top of the fan unit is located at a first height and the bottom of the fan unit is located at a second height, the hand dryer comprising:
a plurality of air intakes, the air intakes being connected to the fan unit to form a plurality of parallel air-intake paths, each air intake path being provided with a separate air-filter, and at least a portion of each filter is located between the first height and the second height;
an outer filter cover associated with each filter comprising a plurality of slots forming a filter inlet for the respective filter, the outer filter cover positioned in-between the respective filter and the respective air intake; and
an inner filter cover associated with each filter comprising a plurality of apertures forming a filter outlet for the respective filter, the inner filter cover positioned in-between the respective filter and the fan unit, wherein the filter inlet and filter outlet are off-set to prevent line-of-sight through the filter inlet and the filter outlet.

5. The hand dryer of claim 4, in which the filters are replaceable filters which are individually replaceable.

6. The hand dryer of claim 4, in which the filters are planar.

7. The hand dryer of claim 6, in which the filters are arranged with their planes facing one another.

8. The hand dryer of claim 7, in which the filters are arranged substantially plane parallel.

9. The hand dryer of claim 4, in which the filters are arranged adjacent the fan unit.

\* \* \* \* \*